United States Patent
Horton et al.

(10) Patent No.: US 7,083,237 B2
(45) Date of Patent: Aug. 1, 2006

(54) SHOCK ABSORBER FOR JUVENILE VEHICLE SEAT TETHER

(75) Inventors: William Horton, Hope, IN (US);
Steven Oltman, Hope, IN (US);
Eugene Balensiefer, Seymour, IN (US);
Richard Glover, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 391 days.

(21) Appl. No.: 10/714,181

(22) Filed: Nov. 14, 2003

(65) Prior Publication Data

US 2004/0095004 A1    May 20, 2004

Related U.S. Application Data

(60) Provisional application No. 60/426,150, filed on Nov. 14, 2002.

(51) Int. Cl.
*B60R 22/28* (2006.01)

(52) U.S. Cl. .................. 297/471; 297/472; 297/216.11; 280/805

(58) Field of Classification Search ........... 297/216.11, 297/250.1, 254, 470–472, 468; 280/801.1, 280/805
See application file for complete search history.

(56) References Cited

U.S. PATENT DOCUMENTS

| | | | | |
|---|---|---|---|---|
| 3,862,673 A | * | 1/1975 | Benson | 297/471 |
| 4,256,273 A | * | 3/1981 | Burleigh | 297/472 |
| 5,544,918 A | * | 8/1996 | Fleming et al. | 280/805 |
| 5,971,489 A | | 10/1999 | Smithson et al. | |
| 6,513,870 B1 | | 2/2003 | Takizawa | |
| 6,619,752 B1 | | 9/2003 | Glover | |
| 6,767,057 B1 | * | 7/2004 | Neelis | 297/472 |

FOREIGN PATENT DOCUMENTS

DE             2419193      * 11/1975

* cited by examiner

*Primary Examiner*—Peter R. Brown
(74) *Attorney, Agent, or Firm*—Barnes & Thornburg LLP

(57) ABSTRACT

A juvenile restraint system includes a juvenile seat and a tether coupled at one end to the juvenile seat and at an opposite end to an anchor provided in a vehicle.

10 Claims, 3 Drawing Sheets

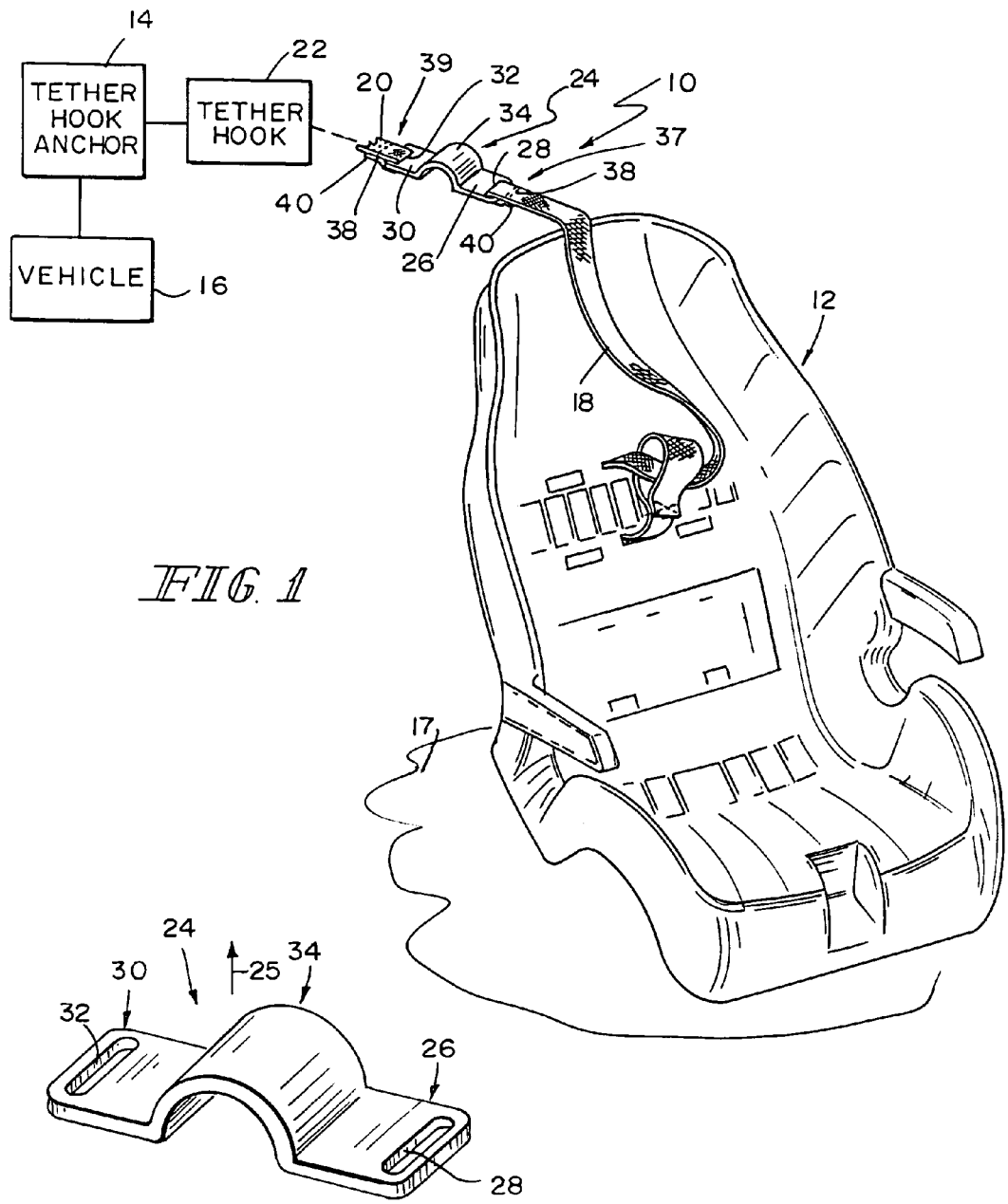
FIG. 1
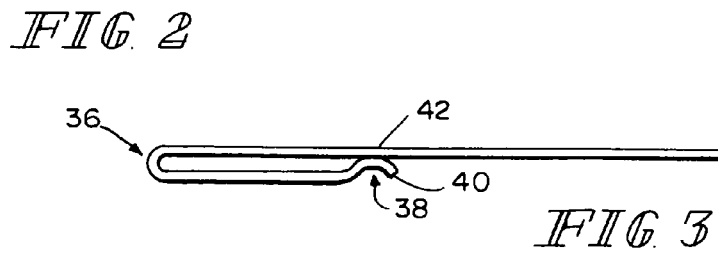
FIG. 2
FIG. 3

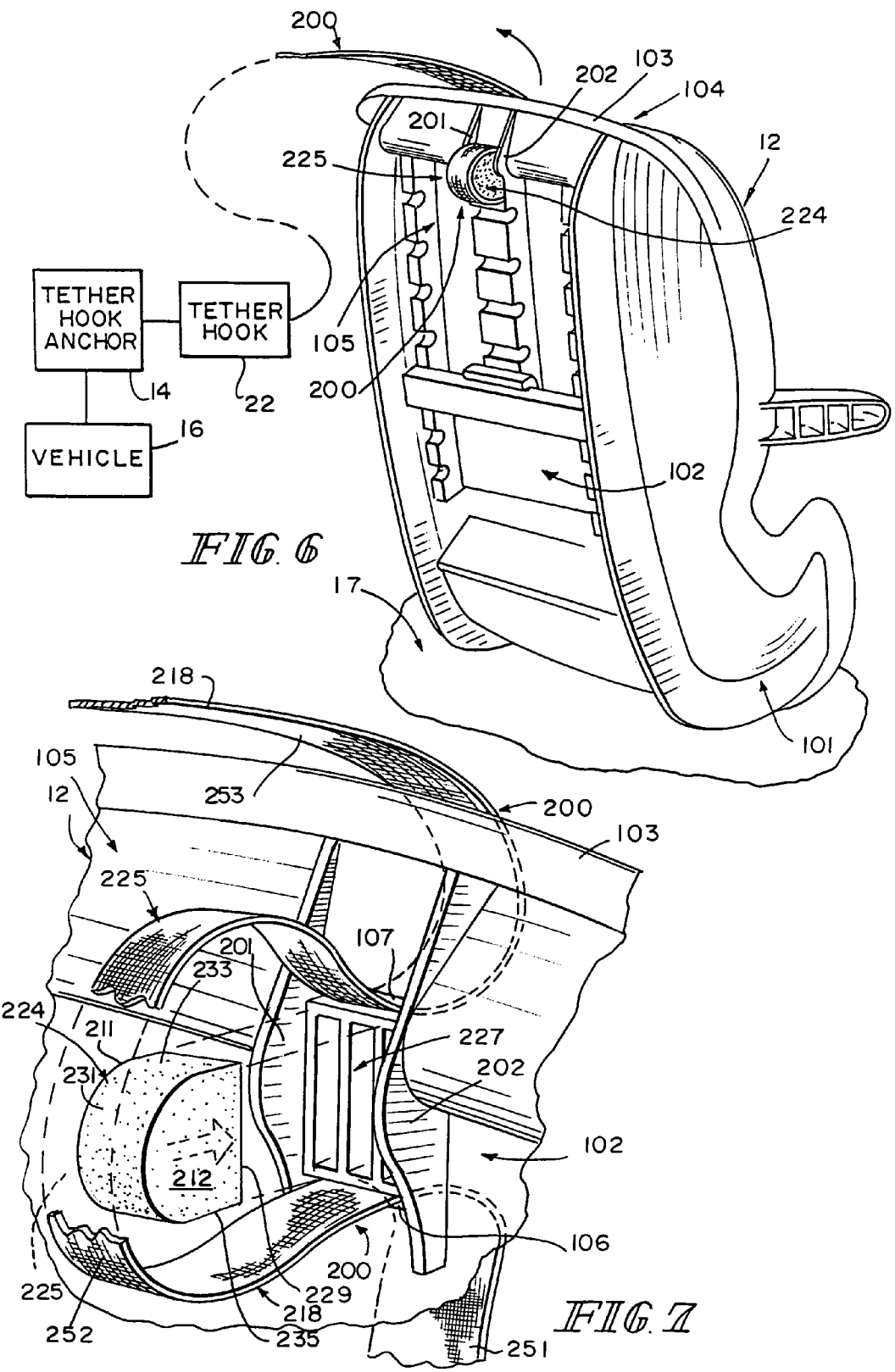

SHOCK ABSORBER FOR JUVENILE VEHICLE SEAT TETHER

This application claims priority under 35 U.S.C. § 119(e) to U.S. Provisional Application Ser. No. 60/426,150, filed Nov. 14, 2002, which is expressly incorporated by reference herein.

BACKGROUND

The present disclosure relates to tethers, and in particular, to juvenile vehicle seat tethers. More particularly, the present disclosure relates to a tether adapted to be coupled at one end to a juvenile vehicle seat and at another end to a tether anchor mounted in a vehicle.

SUMMARY

A juvenile restraint system includes a juvenile seat, a tether coupled to the juvenile seat, and an energy absorber. The energy absorber is coupled to the tether and arranged to be deformed by movement of the tether relative to the juvenile seat to absorb energy transmitted by the tether.

In certain illustrative embodiments, the energy absorber interconnects a first tether strap coupled to a juvenile seat and a second tether strap coupled to a tether anchor in a vehicle. In another illustrative embodiment, the tether forms a loop and the energy absorber is trapped in a space between the loop and the juvenile seat.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 1 is a perspective view of an energy absorber in accordance with a first embodiment of the present disclosure showing an upper portion of a seat back of a juvenile vehicle seat and showing a tether strap coupled to the seat back and an energy absorber coupled (at one end) to the tether strap and (at another end) to a tether hook adapted to mate with a hook anchor mounted in a vehicle;

FIG. 2 is an enlarged perspective view of the energy absorber of FIG. 1;

FIG. 3 is a diagrammatic view of a loop provided on the tether strap shown in FIG. 1;

FIG. 6 is a perspective view of an energy absorber in accordance with a third embodiment of the present disclosure located on a seat back of a juvenile vehicle seat; and FIG. 7 is an enlarged perspective view, with portions broken away, of the energy absorber and seat back of FIG. 6.

DETAILED DESCRIPTION

Figure 4:
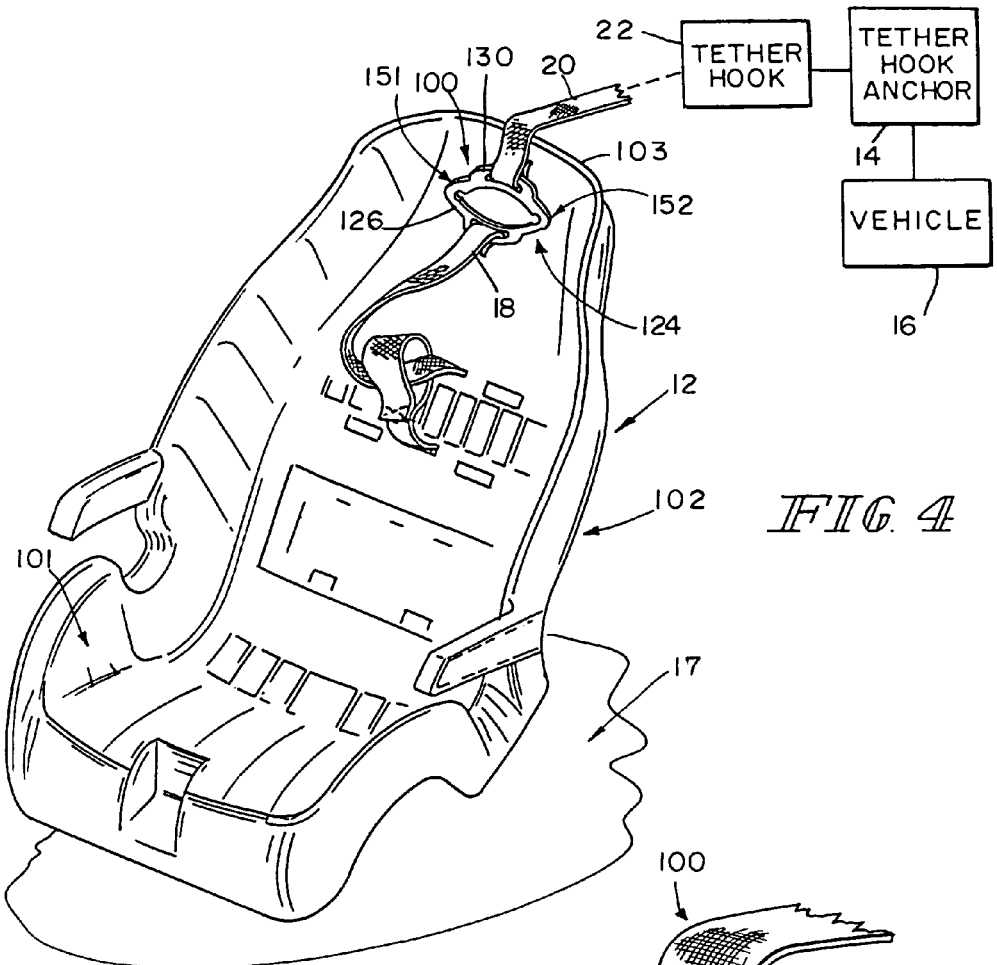
FIG. 4 is a perspective view of an energy absorber in accordance with a second embodiment of the present disclosure located on a seat back of a juvenile vehicle seat.
Figure 5:
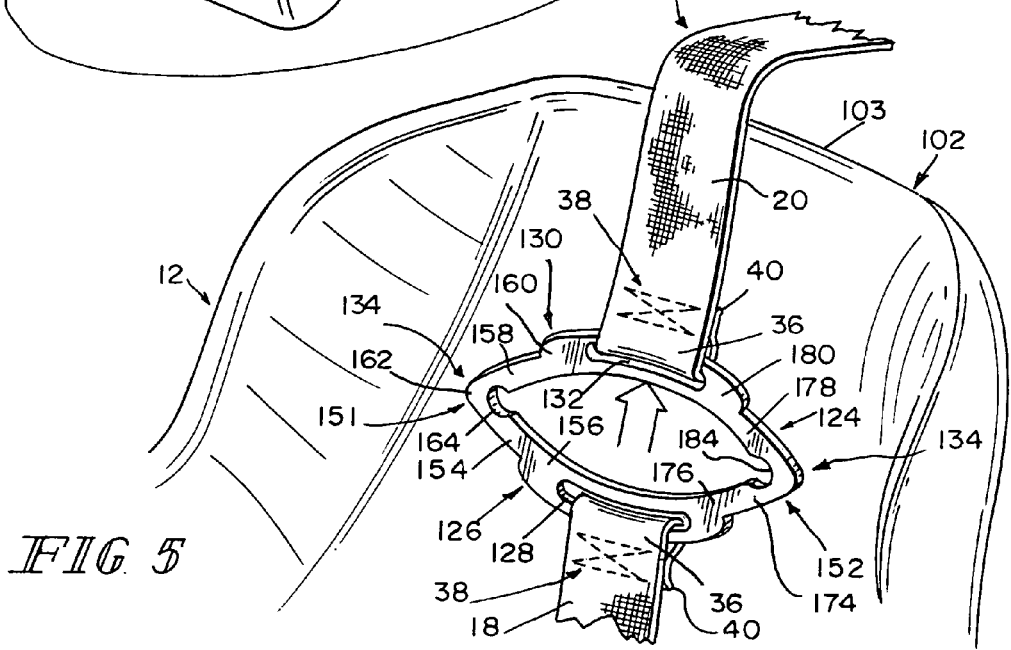
FIG. 5 is an enlarged perspective view of an upper portion of the seat back and the energy absorber of FIG. 4.

An energy absorber is coupled to a juvenile seat tether to provide a juvenile restraint system that operates to absorb energy transmitted by the tether during an impact to a vehicle transporting the juvenile seat. A first embodiment of a juvenile restraint system in accordance with the present disclosure is illustrated in FIGS. 1–3. A second embodiment is shown in FIGS. 4 and 5. A third embodiment is shown in FIGS. 6 and 7.

Energy absorbers 24, 124, 224 are coupled to tethers 10, 100, 200, respectively, as suggested, for example, in FIGS. 1, 4, and 6. These energy absorbers are made of an elastic material and is arranged to be deformed by a companion tether (and thus absorb energy) to vary from an initial state (shown in FIGS. 1, 4, and 6) cooperating with the tether to establish the predetermined length of the tether to a deformed state (not shown). In the deformed state, the energy absorber is stretched or compressed and thus cooperates with the tether to allow extension of the tether to an extended length that is greater than the predetermined length in response to application of a "pulling" force applied to the first end of the extensible tether owing to movement of juvenile seat 12 relative to energy absorber 24. Such seat movement might occur, for example, when seat 12 is jostled on seat 17 during an impact to vehicle 16.

An extensible tether 10 is adapted to anchor a juvenile vehicle seat 12 to a tether hook anchor 14 mounted in a vehicle 16 to help stabilize juvenile vehicle seat 12 in place on a seat 17 in vehicle 16 as shown diagrammatically in FIG. 1. Tether 10 comprises a first tether strap 18 adapted to be coupled using any suitable means to juvenile vehicle seat 12 to establish a first end of tether 10, a second tether strap 20 adapted to be coupled using any suitable means to a tether hook 22 to establish a second end of tether 10, and an energy absorber 24 coupled to first and second tether straps 18, 20. Tether 10 is arranged normally to have a predetermined length so that juvenile vehicle seat 12 can be located and retained in a selected position on seat 17 of vehicle 16 during normal use. It is within the scope of this disclosure to couple energy absorber 24 to juvenile vehicle seat 12 and to tether hook 22. Tether hook 22 provides means for engaging an anchor 14 in vehicle 16 to limit movement of juvenile vehicle seat 12 in vehicle 16.

Energy absorber 24 is monolithic and made of an elastic material (e.g., steel or thermoplastic rubber) to yield and recover its shape in response to deforming forces applied by tether straps 18, 20. As shown in FIGS. 1 and 2, energy absorber 24 includes a first strap mount 26 formed to include a strap receiver slot 28 and coupled to a free end 37 of first tether strap 18, a second strap mount 30 formed to include a strap receiver slot 32 and coupled to a free end 39 of second strap 20, and a deformable bridge 34 arranged to interconnect first and second strap mounts 26, 30.

Deformable bridge 24 is arranged to interconnect first and second strap mounts 26, 30 and configured to yield from an initial shape (shown in FIGS. 1 and 2) to allow movement of first and second strap mounts 26, 30 away from one another in response to application of the pulling force applied to the first end of the first tether strap 18 during deformation (e.g., elongation or stretching) of energy absorber 24 to assume the deformed state and to recover the initial shape to move first and second strap mounts 26, 30 toward one another during relaxation of energy absorber 24 to assume the initial state upon cessation of application of the pulling force applied to the first end of first tether strap 18. As suggested in FIGS. 1 and 2, in an illustrative embodiment, deformable bridge 24 has a half-cylinder shape upon relaxation of energy absorber 24 to assume the initial state.

As suggested in FIG. 2, each of first and second strap mounts 26, 30 is a flat plate and the flat plates are arranged to lie in coplanar relation to one another. Deformable bridge 24 extends in a first direction 25 away from first and second strap mounts 26, 30 and has a bowed shape upon relaxation of the energy absorber to assume the first shape.

Each of tether straps 18, 20 is formed to include a loop 36 at the free end thereof as shown in FIGS. 1 and 3 to allow the strap to be coupled to energy absorber 24. In an illustrative embodiment, a box stitch 38 (or other suitable connector) is used to fix a distal end 40 of the strap to another portion 42 of the strap to form a loop 36 sized to pass through one of the strap receiver slots 28, 32 formed in energy absorber 24. It is within the scope of this disclosure to use other suitable connectors to couple each strap 18, 20 to energy absorber 24.

In a second embodiment shown in FIGS. 4 and 5, an extensible tether 100 is adapted to anchor a juvenile vehicle seat 12 to a tether hook anchor 14 mounted in a vehicle 16. Tether 100 comprises first tether strap 18 adapted to be coupled using any suitable means to juvenile vehicle seat 12, a second tether strap 20 adapted to be coupled using any suitable means to a tether hook 22, and an energy absorber 124 coupled to first and second tether straps 18, 20.

Energy absorber 124 is monolithic and made of an elastic material to yield and recover its shape in response to deforming forces applied by tether straps 18, 20. As shown in FIG. 5, energy absorber 124 includes a first strap mount 126 formed to include a strap receiver slot 128, a second strap mount 130 formed to include a strap receiver slot 132, and a deformable bridge 134 arranged to interconnect first and second strap mounts 126, 130.

Deformable bridge 134 is arranged to interconnect first and second strap mounts 126, 130 and configured to yield from an initial shape (shown in FIGS. 4 and 5) to allow movement of first and second strap mounts 126, 130 away from one another in response to application of the pulling force applied to the first end of the first tether strap 18 during deformation (e.g., elongation or stretching) of energy absorber 124 to assume the deformed state and to recover the initial shape to move first and second strap mounts 126, 130 toward one another during relaxation of energy absorber 124 to assume the initial state upon cessation of application of the pulling force applied to the first end of first tether strap 18. In the illustrated embodiment, energy absorber 124 has a football shape and is made of a thin sheet of elastic material.

In the illustrated embodiment of FIGS. 4 and 5, each of strap mounts 126, 130 is an arcuate flat plate. Also, deformable bridge 134 comprises two separate V-shaped bridge sections 151, 152. Bridge section 151 includes a first distal portion 154 coupled to a left end 156 of first strap mount 126, a second distal portion 158 coupled to a left end 160 of second strap mount 130, and a central portion 162 formed to include a C-shaped opening 164. Likewise, bridge section 152 includes a first distal portion 174 coupled to a right end 176 of first strap mount 126, a second distal portion 178 coupled to a right end 180 of second strap mount 130, and a central portion 182 formed to include a C-shaped opening 184. Bridge sections 152 are arranged so that the C-shaped openings 164, 184 face toward one another as shown in FIG. 5.

Each of the tether straps 18, 20 shown in FIGS. 4 and 5 is formed to include a loop 36 as shown, for example, in FIG. 3. Each loop 36 is coupled to one of the strap mounts 126, 130 in the manner described herein.

In a third embodiment shown in FIGS. 6 and 7, an extensible tether 200 is adapted to anchor a juvenile vehicle seat 12 to a tether hook anchor 14 mounted in a vehicle 16. Tether 200 comprises a tether strap 218 adapted to be coupled using any suitable means to juvenile vehicle seat 12 and to a tether hook 22 and an energy absorber 224 positioned to be wedged or otherwise retained between a loop 225 formed in tether strap 218 and a portion 227 of a seat back 101 of juvenile vehicle seat 12.

Energy absorber 224 is made of an elastic material (e.g., plastic, foam, or metal) selected to deform under loading forces applied by loop 225 of tether strap 218 and then recover its shape once the loading forces are removed. As shown in FIG. 7, energy absorber 224 includes a flat wall 229 positioned to engage portion 227 of seat back 102 providing an absorber platform, a curved wall 231 positioned to engage loop 225 formed in tether strap 218, and flat side walls 233, 235. Loop 225 of tether strap 218 wraps around, e.g., side wall 233, curved wall 231, and side wall 235 of energy absorber 224 to secure energy absorber 224 in place against portion 227 of seat back 102 as shown, for example, in FIG. 6.

Juvenile seat 12 includes a seat bottom 101 and a seat back 102 extending upwardly away from seat bottom 101 to terminate at a top edge 103. Energy absorber 124 is located adjacent to seat back 102 in a position between seat bottom 101 and top edge 103 of seat back 102. First tether strap 18 extends along seat back 102, and second tether strap 20 extends along seat back 102 and passes over top edge 103 of seat back 102 as suggested in FIGS. 4 and 5.

As suggested in FIGS. 6 and 7, juvenile seat 12 includes a seat bottom 101 and a seat back 102 extending upwardly from seat bottom 101 and energy absorber 224 is retained between a loop 225 formed in tether 200 and a portion 227 of seat back 102. Seat back 102 includes a front side 104 facing toward an occupant (not shown) seated on seat bottom 101 and a rear side 105 facing away from an occupant seated on seat bottom 101 and the portion 227 of seat back 102 is located on rear side 105 as suggested in FIGS. 4 and 5.

Seat back 102 further includes two fins 201, 202 appended to rear side 105 of seat back 102 and arranged to extend away from front side 104 of seat back 102 to locate portion 227 of seat back 102 therebetween. Energy absorber 224 lies between the two fins 201, 202 and includes a first side wall 211 facing toward and engaging first fin 201 and a second side wall 212 facing toward and engaging a second fin 202.

Seat back 102 is formed to include first and second tether-receiving slots 106, 107 extending between front and rear sides 104, 105 as shown in FIG. 7. First tether-receiving slot 106 lies between seat bottom 101 and potion 227 of seat back 102. Portion 227 of seat back 102 lies between first and second tether-receiving slots 106, 107. Tether 200 passes through first and second tether-receiving slots 106, 107 and comprises, in sequence, a first portion 251 (shown in phantom) extending along front side 104 to first tether-receiving slot 106, a second portion 252 extending along the rear side between first and second tether-receiving slots 106, 107 (and forming loop 225) and engaging energy absorber 224, and a third portion 253 extending from second tether-receiving slot 107 along front side 104 toward and over top edge 103 of seat back 102.

First and second tether-receiving slots 106, 107 are arranged to lie in spaced-apart relation to one another to define absorber platform 227 therebetween. Tether 200 passes through first and second tether-receiving slots 106, 107 to form a loop 225 arranged to lie in confronting relation to absorber platform 227. Energy absorber 224 is located in a space provided between loop 225 and absorber platform 227. Energy absorber 224 is made of an elastic material and arranged to be compressed by tether 200 against absorber platform 227 to vary from an initial state (shown in FIGS. 6 and 7) to a deformed state (not shown) in response to movement of loop 225 toward absorber platform 227 during application of a pulling force to tether 200 to cause tether 200 to move through at least one of first and second tether-receiving slots 106, 107. Each slot 106, 107 has an opening in each of the front and rear sides.

Each of energy absorbers 24, 124, and 224 is configured to deform when squeezed under loads applied by one or more tether straps coupled thereto as a longitudinal tugging force is applied to the tether strap(s) during sudden vehicle stoppage or slowdown. Such deformation allows the tether strap to lengthen by a predictable amount during sudden vehicle stoppage or slowdown. Each energy absorber 24, 124, 224 is a compliant member made of a deformable elastic material. As used herein, "compliant" means the quality or state of yielding to external forces within an elastic limit.

During movement of juvenile vehicle seat 12 away from tether hook anchor 14 of the type that might occur during any sudden stoppage or slowdown of vehicle 16, a longitudinal tugging force will be applied to the tether strap. Such a longitudinal tugging force will, in many cases, be sufficient to deform the energy absorber (24, 124, or 224) to increase the effective length of the tether by a predictable amount. Such an increase in effective length tends to minimize acceleration of juvenile vehicle seat 12 during such sudden vehicle stoppage or slowdown.

The invention claimed is:

1. A juvenile restraint system comprising
a juvenile seat,
a tether including a first end coupled to the juvenile seat and a second end adapted to be coupled to an anchor in a vehicle, the tether being arranged normally to have a predetermined length between the first and second ends, and
an energy absorber coupled to the tether and made of an elastic material and arranged to be deformed by the tether to vary from an initial state cooperating with the tether to establish the predetermined length of the tether to a deformed state cooperating with the tether to allow extension of the tether to an extended length greater than the predetermined length in response to application of a pulling force applied to the first end of the extensible tether owing to movement of the juvenile seat relative to the energy absorber, wherein the juvenile seat includes a seat bottom and a seat back extending upwardly from the seat bottom and the energy absorber is retained between a loop formed in the tether and a portion of the seat back.

2. The system of claim 1, wherein the seat back includes a front side facing toward an occupant seated on the seat bottom and a rear side facing away from an occupant seated on the seat bottom and the portion of the seat back is located on the rear side.

3. The system of claim 2, wherein the seat back further includes two fins appended to the rear side of the seat back and arranged to extend away from the front side of the seat back to locate the portion of the seat back therebetween and the energy absorber lies between the two fins and includes a first side wall facing toward a first of the fins and a second side wall facing toward a second of the fins.

4. The system of claim 1, wherein the energy absorber includes a curved wall positioned to engage the loop formed in the tether.

5. The system of claim 4, wherein the energy absorber further includes a flat wall engaging the portion of the seat back and first and second side walls extending from the flat wall to the curved wall and the seat back further includes a first fin extending away from the portion of the seat back and engaging the first side wall of the energy absorber and a second fin extending away from the portion of the seat back and engaging the second side wall of the energy absorber to locate the energy absorber between the first and second fins.

6. The system of claim 1, wherein the seat back includes a front side facing toward an occupant seated on the seat bottom and a rear side facing away from an occupant seated on the seat bottom, the portion of the seat back is located on the rear side, the seat back is formed to include first and second tether-receiving slots extending between the front and rear sides, the first tether-receiving slot lies between the seat bottom and said portion of the seat back, the portion of the seat back lies between the first and second tether-receiving slots, and the tether passes through the first and second tether-receiving slots and comprises, in sequence, a first portion extending along the front side to the first tether-receiving slot, a second portion extending along the rear side between the first and second tether-receiving slots and engaging the energy absorber, and a third portion extending from the second tether-receiving slot along the front side toward a top edge of the seat back.

7. A juvenile restraint system comprising
a juvenile seat formed to include first and second tether-receiving slots arranged to lie in spaced-apart relation to one another to define an absorber platform therebetween,
a tether passing through the first and second tether-receiving slots to form a loop arranged to lie in confronting relation to the absorber platform, and
an energy absorber located in a space provided between the loop and the absorber platform, the energy absorber being made of an elastic material and arranged to be compressed by the tether against the absorber platform to vary from an initial state to a deformed state in response to movement of the loop toward the absorber platform during application of a pulling force to the tether to cause the tether to move through at least one of the first and second tether-receiving slots.

8. The system of claim 7, wherein the juvenile seat includes a seat bottom and a seat back extending upwardly from the seat bottom, the seat back includes a front side facing toward an occupant seated on the seat bottom and a rear side facing away from an occupant seated on the seat bottom, the seat back is formed to include the first and second tether-receiving slots, each slot has an opening in each of the front and rear sides, and the absorber platform is located on the rear side.

9. The system of claim 8, wherein the seat back further includes two fins appended to the rear side of the seat back and arranged to extend away from the front side of the seat back to locate the absorber platform therebetween and the energy absorber lies between the two fins.

10. The system of claim 8, wherein the energy absorber includes a curved wall positioned to engage the loop formed in the tether.

* * * * *